Patented Sept. 29, 1953

2,653,856

UNITED STATES PATENT OFFICE 2,653,856

PREPARATION OF BERYLLIUM FLUORIDE

Guy Barr, Teddington, England, assignor to Minister of Supply in His Majesty's Government of the United Kingdom of Great Britain and Northern Ireland, London, England No Drawing. Application January 23, 1948, Serial No. 4,061. In Great Britain February 14, 1947

2 Claims. (Cl. 23—88)

The invention relates to the preparation of solid beryllium fluoride.

It is known that beryllium oxide dissolves in aqueous hydrofluoric acid with the formation of the fluoride, but on evaporation of the resulting solution some of the combined acid is lost and the residue is believed to be an oxy fluoride of the composition $2BeO.5BeF_2$. The presence of the relatively high amount of oxygen is undesirable when the fluoride is to be used for preparing metallic beryllium. In addition it has been proposed to prepare beryllium fluoride by forming the double salt $BeF_2.2NH_4F$, which is relatively insoluble in water, and bringing about its decomposition by heating to 400° C., in accordance with the following equation $$BeF_2.2NH_4F = BeF_2 + 2NH_4F$$

An examination of the above process has shown that while decomposition of the said double salt commences at about 210° C., decomposition is not complete at 400° C., and further that unless the temperature is raised very slowly the mass undergoing decomposition partially liquefies, and bubbles of escaping gas or vapour are likely to cause frothing, which may result in loss of product. This process has the further disadvantage that the evolution of expensive and toxic ammonium fluoride necessitates the provision of efficient, corrosion-resisting apparatus for recovery of the salt.

The object of the present invention is to provide a simple and efficient method of producing solid beryllium fluoride which method will not involve substantial evolution of ammonium fluoride and which will nevertheless give a product of an appreciably lower oxygen content than that of the oxy fluoride referred to above.

According to the invention beryllium fluoride is prepared from the double salt $BeF_2.2NH_4F$ by heating the said salt in admixture with beryllium oxide to bring about its decomposition.

Preferably the amount of double salt employed is in excess of an equimolecular amount. The mixture is preferably heated to a temperature of not less than 400° C. and desirably to at least 450° C.

According to one convenient method of carrying the invention into effect an intimate mixture of beryllium oxide (1 mol.), and double salt $BeF_2.2NH_4F$ (1.1 mol.) is heated in a vessel to 450° C. until ammonia ceases to be evolved. Beryllium fluoride with an oxygen content equivalent to 2 per cent of BeO has been obtained in this way. The reaction is thought to proceed as follows:

$$BeO + BeF_2.2NH_4F = 2BeF_2 + 2NH_3 + H_2O$$

Frothing was found to be much less than resulted from heating the double salt alone as described above.

Scrubbing of the effluents is relatively simple since it involves recovery only of ammonia containing a small proportion of ammonium fluoride.

I claim:

1. The process of preparing solid beryllium fluoride wherein a mixture consisting essentially of beryllium ammonium fluoride ($BeF_2.2NH_4F$) and beryllium oxide in the proportion of substantially one mol of beryllium oxide to 1.1 mol of beryllium ammonium fluoride is heated at a temperature of at least 450° C. until ammonia ceases to be evolved and the solid beryllium fluoride produced is recovered.

2. The process for the preparation of solid beryllium fluoride which comprises the steps forming a mixture of beryllium ammonium fluoride and beryllium oxide in approximately equimolecular proportions with the former compound in small excess, heating the mixture to bring about reaction between the compounds with the formation of beryllium fluoride and ammonia, discontinuing the heating when ammonia ceases to be evolved and recovering the solid beryllium fluoride produced.

GUY BARR.

References Cited in the file of this patent

UNITED STATES PATENTS

| Number | Name | Date |
|---|---|---|
| 2,233,465 | Adamoli | Mar. 4, 1941 |

FOREIGN PATENTS

| Number | Country | Date |
|---|---|---|
| 485,711 | Great Britain | May 24, 1938 |

OTHER REFERENCES

Thorpe's Dictionary of Applied Chemistry, vol. VI, page 15 (Fourth Ed.), 1943. Longmans, Green and Co., N. Y.